United States Patent [19]

Ikezaki et al.

[11] Patent Number: 5,596,342
[45] Date of Patent: Jan. 21, 1997

[54] DISPLAY DEVICE HAVING SEPARATE SHORT CIRCUIT WIRES FOR DATA AND GATE LINES FOR PROTECTION AGAINST STATIC DISCHARGES

[75] Inventors: Mitsuru Ikezaki, Fujisawa; Shinichi Kimura; Tatsushi Koike, both of Sagamihara, all of Japan

[73] Assignee: International Business Machines Corporation, Armonk, N.Y.

[21] Appl. No.: 338,058

[22] Filed: Nov. 10, 1994

[30]  Foreign Application Priority Data

Nov. 10, 1993  [JP]  Japan .................................. 5-281476

[51] Int. Cl.⁶ ........................................................ G09G 3/36
[52] U.S. Cl. ............................................................. 345/87
[58] Field of Search ................................. 345/87, 90, 92, 345/93, 97, 103, 50; 359/54, 56, 59, 60; 361/91, 111; 257/355, 356, 546

[56]  References Cited

U.S. PATENT DOCUMENTS

4,840,459  6/1989  Strong ........................................ 345/87
4,860,148  8/1989  Iwamura et al. ........................... 361/91
5,068,748  11/1991  Ukai et al. ................................. 359/59
5,144,392  9/1992  Brotherton ................................. 361/91

Primary Examiner—Richard Hjerpe
Assistant Examiner—Chanh Nguyen
Attorney, Agent, or Firm—Ronald L. Drumheller

[57]  ABSTRACT

To prevent the damage of a display device by static electricity and to drive the display device with low voltage, on a transparent substrate of a liquid crystal display, two short circuit wires are provided, connected via a resistance. Each of the data lines is connected to the one short circuit wire via a first switching circuit, whereas each of the gate lines is connected to the other short circuit wire via a second switching circuit. A switching circuit is turned on when the potential difference between a data line and the one short circuit wire or the potential difference between a gate line and the second short circuit wire exceeds a predetermined value. When images are displayed on a liquid crystal display, the average voltage applied to each of data lines is applied to the first short circuit wire and the average voltage of voltages applied to each gate line is applied to the second short circuit wire to turn on the switching circuits.

9 Claims, 6 Drawing Sheets

DISPLAY DEVICE HAVING SEPARATE SHORT CIRCUIT WIRES FOR DATA AND GATE LINES FOR PROTECTION AGAINST STATIC DISCHARGES

BACKGROUND OF THE INVENTION

1. Field of the Invention

The present invention relates to a display device and a method for driving a display device, and more particularly to a display device displaying an image with applying a voltage to a plurality of wiring structures for driving and a method for driving a display, said method being intended for driving the display device.

2. Related Art

Conventionally liquid crystal display (LCD) devices are known as display devices for displaying such images as characters and figures in data processing devices such as personal computers. Liquid crystal displays are available in various types of different constructions. In recent years, active matrix driving liquid crystals are widely used. These employ thin film transistors (TFT) and the like, can accurately control the tone of images, and are suitable for the display of fast moving animated images.

For example, in TFT liquid crystal displays, a plurality of data lines and a plurality of gate lines are arranged so as to intersect each other on one of two opposing surfaces of a pair of transparent substrates made of a material such as glass and arranged opposite each other. A TFT is arranged at each position at which data lines and gate lines intersect. An electrode is formed on the other opposing surface of the transparent substrates. A liquid crystal is disposed between the pair of transparent substrates. Images are displayed on TFT liquid crystal displays with the application of voltage to gate lines to turn on a plurality of transistors one after another as well as with application of voltage corresponding to display images to data lines.

Since data lines, gate lines and electrodes are insulated from each other in liquid crystal displays, static electricity is liable to be generated. For example, friction from the wind in clean rooms in the manufacturing process of liquid crystal displays generates electricity. This static electricity is applied to a switching element such as a TFT as high voltage. A large current instantly flows due to discharge of electricity to the outside when probes are contacted in the inspection process, and the liquid crystal display is electrified overall, deteriorating and damaging the switching element. This has become a factor decreasing the manufacturing yield of liquid crystal displays.

To solve this problem, a proposal was made to cut off a portion where a short circuit line (below referred to as an external short circuit line) is provided on the external periphery of an area on a transparent substrate where a switching element is provided with data lines and gate lines connected to the external short circuit line. In the above example, in the stage before the external short circuit wire is cut off, it is possible to prevent high voltage from being applied to the switching element, but between the time that the portion where the external short circuit line is formed is cut off and the time that the LCD is installed in the device and made to contact the LCD driver and the like, the switching element can be deteriorated and damaged by static electricity. Thus it is not sufficient as a countermeasure against static electricity.

In addition, PUPA 63-85586 and PUPA 3-134628 propose that a short circuit line (herein referred to as internal short circuit line) is formed which is not on the above cut off portion in an external periphery area of the transparent substrate where the switching element is provided. In order to avoid an unfavorable effect of the internal short circuit line when the internal short circuit line is driven, a proposal is made to connect the above internal short circuit line, data lines and gate lines via a connecting element.

However, the above design has the drawback of increasing the overall power consumption of the liquid crystal display because the resistance of the connecting element consumes power when voltage is applied to data lines and gate lines for displaying images on the liquid crystal display.

Figure 7:
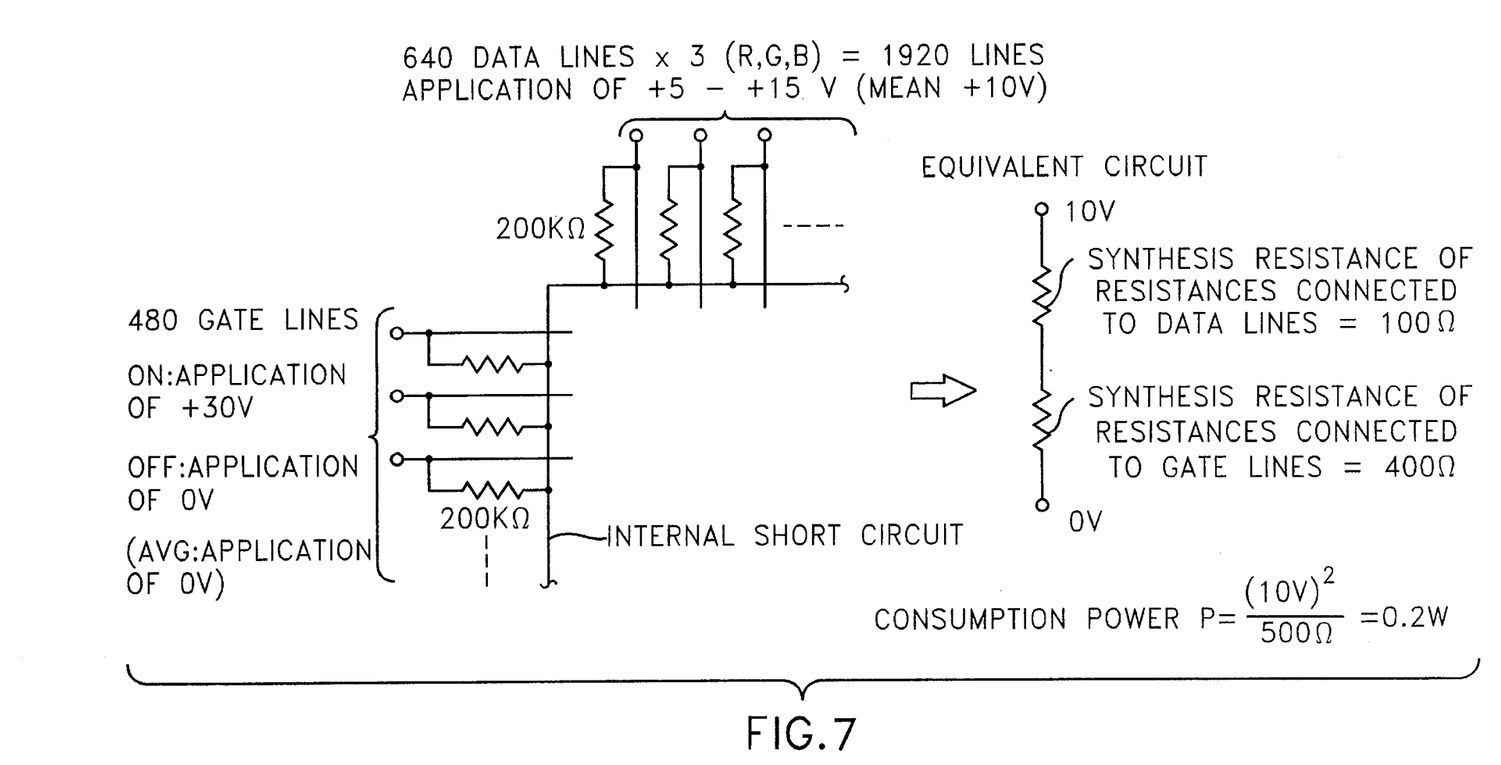
FIG. 7 is a view explaining the operation of power consumption P of resistance in the prior art connecting the data line, the gate line, and the internal short circuit wire via resistance.

As an example, a liquid crystal display with 640×480 pixels which can display color images includes 1920 data lines and 480 gate lines. As shown in FIG. 7, data lines, gate lines and the internal short circuit wire are respectively connected to this liquid crystal display via a connecting element with a resistance of 200 kΩ. A voltage of 5 to 15 V is applied to data lines in accordance with the display image. To gate lines that are turned on a voltage of +30 V is applied and to other gate lines a voltage of 0 V is applied to display images. The average value of voltage applied to data lines and gate lines becomes about +10 V and about 0 V respectively. The synthesized resistance connected to data lines is about 200 kΩ, but the total effective resistance is only about 100Ω because 1920 resistances of 200 kΩ are connected in parallel. The synthesized resistance connected to gate lines is 300 kΩ but the total effective resistance becomes about 400Ω because 280 resistances of 300 kΩ are connected in parallel. Thus an equivalent circuit like that shown in FIG. 7 is provided. The power consumption P by all the resistances is:

$$\text{power of consumption } P = V^2 \div R = (10V)^2 \div 500\Omega = 0.2W$$

Consequently, in the above equation, power consumption of P (=0.2 W) is added to the power consumption of the main body of the liquid crystal display.

In particular, reduction in power consumption is an important issue in electronic devices like portable computers that allow operation by batteries, in consideration of portability. Liquid crystal displays to be mounted on such electronic devices must be low in power consumption. The power consumption of the main body of liquid crystal displays mounted on electronic devices like portable computers is about 0.6 W. The power consumption P caused by the resistance described above is very large with respect to the power consumption of the liquid crystal display. In addition, when the electric resistance value is heightened to reduce the power consumption P, the effectiveness against static electricity is lowered.

Furthermore, PUPA 3-134628 describes that non-linear elements like diodes that provide low resistance on the order of several kΩ are used with respect to high voltages of 70 through 80 V in the connecting element described above. In any case electric power is consumed at the connecting element, and power consumption cannot be sufficiently reduced.

SUMMARY OF THE INVENTION

The present invention has been made in view of the above points. An object of the present invention is to provide a display device that can prevent damage caused by static electricity and can reduce power consumption.

Another object of the present invention is to provide a method for driving a display device that has low power consumption.

To attain the above objectives, a display device in accordance with the invention comprises a display device equipped with a plurality of wiring structures for driving, and displaying an image with applying a voltage to each of said wiring structures, said apparatus comprising:

- a short circuit wire divided into a plurality of portions by impedance elements;
- switching means connected between said plurality of wiring structures and said divided portions of said short circuit wire, and turning on and off in accordance with an electric potential difference between said wiring structures and said divided portions of said short circuit wire; and
- voltage applying means for applying voltage for turning said switching means off to said plurality of divided portions of said short circuit wire.

The method for driving a display device in accordance with the invention comprises a method for driving a display device providing a plurality of wiring structures for driving, a short circuit wire divided into a plurality of portions with an impedance element, a switching means connected between each of the plurality of wiring structures and said divided portions, and turning on and off depending on the potential difference between said wiring structures and divided portions, said method comprising:

- applying voltage that turns off said switching means to each of said divided portions of said short circuit wire; and
- applying voltage to each of said plurality of wiring structures for driving to display an image.

In accordance with the invention, between a plurality of wiring structures for driving and the short circuit line is connected a switching means that is turned on and off depending on the potential difference between the wiring structures for driving and the short circuit wire. Incidentally, the switching means can incorporate a switching element such as a transistors or the like. Such construction of the display means allows electrification of a display device in the manufacturing process. When a specific potential of wiring structures for driving becomes high the switching means turns on (electrifies) the specific wiring structures for driving and the short circuit wire, thereby preventing static electricity from destroying or damaging elements connected to said specific wiring structures for driving.

Voltage applied to wiring structures for driving for displaying images on a display is of varying levels. For example, the voltage applied to each kind of wiring structure for driving differs. An active matrix driven liquid crystal display provides a plurality of data lines and a plurality of gate lines. The volume of voltage applied differs from one to another. Consequently, in accordance with the present invention, the short circuit wire is divided into a plurality of portions with an impedance element. By providing an impedance element, different voltages are applied to a plurality of portions of the short circuit wire divided by impedance elements with voltage application means.

Consequently, the short circuit line is divided with the impedance element for each portion connected to the switching means connected to a single kind of wiring structures for driving (For example, the above liquid crystal display is divided into a portion to which the switching means connected to the data lines is connected and a portion to which the switching means connected to the gate lines is connected). The voltage applying means applies to each portion voltage to turn off the switching means thereby allowing the switching means to turn off between each of the wiring structures for driving and divided portions of the short circuit wire. Incidentally the volume of voltage applied to each portion may be defined in such a manner that the potential difference between wiring structures for driving and the short circuit wire does not become large enough to allow each switching means to turn on in consideration of the volume of voltage applied to wiring structures for driving connected to each portion via a switching means.

In this way, when the current is off between each of the wiring structures for driving and the short circuit wire, the switching means consumes almost no voltage. On the other hand, different voltages are applied to each of the plurality of portions of the short circuit wire, and the current flows through the impedance element so that electric power is consumed at the impedance element. The power consumption at the impedance element is extremely small. Consequently, the power consumption can be reduced compared with a simple connection between the wiring structures for driving and the short circuit wire with resistance or the like.

In the invention, applied voltage that turns on and off a switching means to a plurality of divided portions of the above short circuit wire in a display device comprising a plurality of wiring structures for driving, a short circuit wire divided into a plurality of portions by an impedance element, a switching means connected between each of the plurality of wiring structures for driving and divided portions of the short circuit wire, the switching means turning on and off in accordance with the potential difference between wiring structures for driving and the divided portions of the short circuit wire; and applies voltage to wiring structures for driving to display an image. Consequently, the invention consumes almost no voltage at the switching means, and the electric power consumed in the impedance element is extremely small. Thus the display device can be driven with low electric power consumption.

DESCRIPTION OF THE PREFERRED EMBODIMENTS

An embodiment of the present invention will be described with reference to the accompanying drawings. Incidentally, in the explanation below, numeric values are used that pose no problems in the present invention, but, the present invention is not limited to these numeric values.

Figure 1:
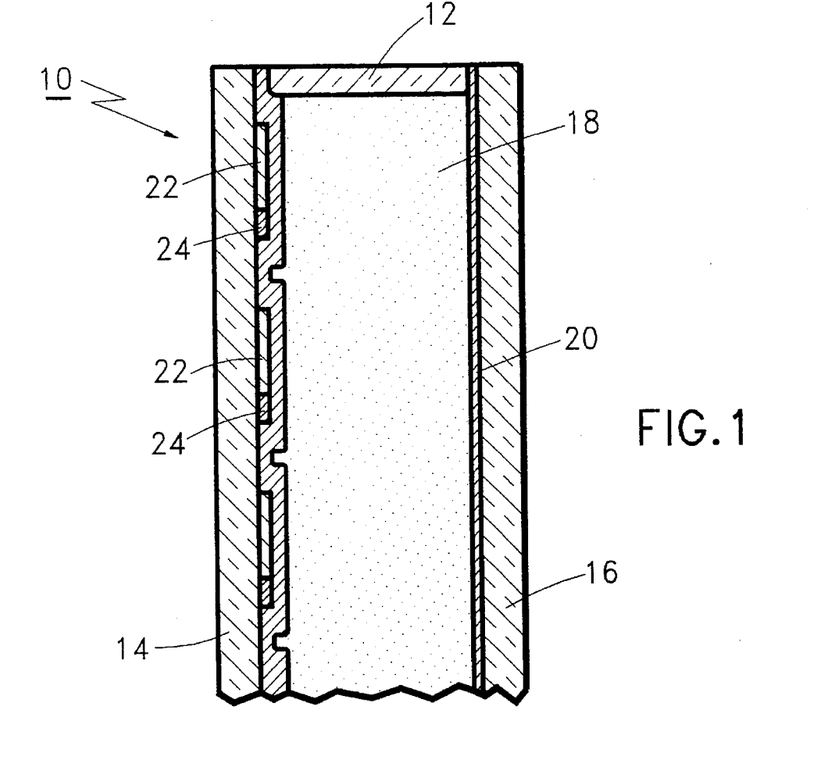
FIG. 1 is a sectional view of the liquid crystal display of the present invention.

Embodiment 1:

FIG. 1 is a sectional view of a liquid crystal display 10 in Embodiment 1 of the present invention. The liquid crystal display 10 provides a pair of transparent substrates 14 and 16 disposed opposite each other with a predetermined space therebetween with a spacer 12. Between the pair of transparent substrates 14 and 16 a liquid crystal 18 is disposed. On the entire surface of the transparent substrate 16 that contacts the liquid crystal 18, an electrode 20 is formed. In addition, on the surface of the transparent substrate 14 which contacts the liquid crystal 18, electrodes 22 and thin film transistors (TFT) 24 are each arranged in matrix. Furthermore, a circuit (see FIG. 2) is provided which drives a TFT 24.

Figure 2:
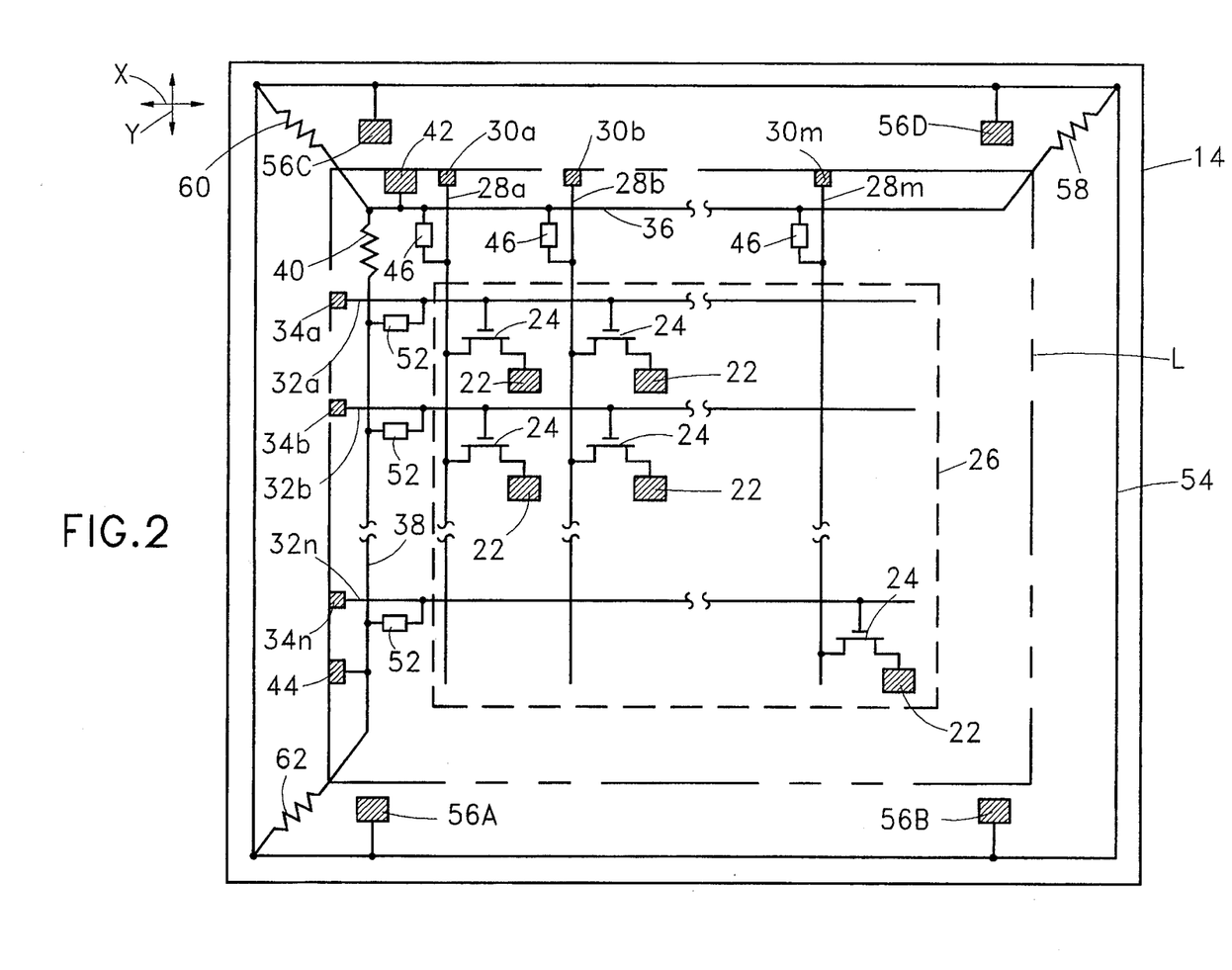
FIG. 2 is a schematic view showing a circuit formed on a transparent substrate of Embodiment 1.

FIG. 2 shows a circuit formed on the transparent substrate 14. TFTs and electrodes 22, m in number in direction X and n in number in direction Y, m x n in total, are each provided in matrix on the transparent substrate 14 within the display region 26 designated with a broken line in FIG. 2. The electrodes 22 are each connected to the source of TFT 24. The drains of TFT 24 are provided in direction X of FIG. 2 on the transparent substrate 14 with a predetermined space therebetween, each of the drains being connected to data lines 28a through 28m, m in number extending in direction Y. Incidentally, data lines 28a through 28m constitute part of the wiring structures for driving of the present invention. At a portion outside the display region 26 at a predetermined distance from the upper end of the transparent substrate 14 shown in FIG. 2, electrodes 30a through 30m are formed with a predetermined spacing in direction X of FIG. 2. The ends of data lines 28a through 28m are connected to electrodes 30a through 30m.

On the other hand, the gates of TFT 24 are provided in direction Y of FIG. 2 with a predetermined space therebetween and connected with n gate lines 32a through 32n extending in direction X of FIG. 2 on the transparent substrate 14. Incidentally, gate lines 32a through 32n constitute part of the wiring structures for driving of the present invention. At a portion outside the display region 26 with a predetermined spacing from the left end of the transparent substrate 14 of FIG. 2, electrodes 34a through 34n are formed in each interval of a predetermined distance in direction Y of FIG. 2. One end of gate lines 32a through 32n are connected to these electrodes 34a through 34n.

Between the upper end of the display region 26 in FIG. 2 and a sequence of electrodes 30a through 30m of data line 28, a short circuit wire 36 is formed in direction X of FIG. 2. Between the left end of the display region 26 in FIG. 2 and a sequence of electrodes 34a through 34n of gate line 32 a short circuit wire 38 is formed in direction Y of FIG. 2. The short circuit wire 36 and the short circuit wire 38 are connected via a resistance 40. This resistance 40 corresponds to an impedance element of the present invention. The short circuit wire 36 and the short circuit wire 38 constitute the short circuit wires of the present invention. The short circuit wires 36 and 38 correspond to a plurality of portions, each divided by an impedance element. To the short circuit wire 36 is connected an electrode 42 provided in alignment with a sequence of electrodes 30a through 30m. To the short circuit wire 38 is connected an electrode 44 connected in alignment with a sequence of electrodes 34a through 34n.

Figure 3:
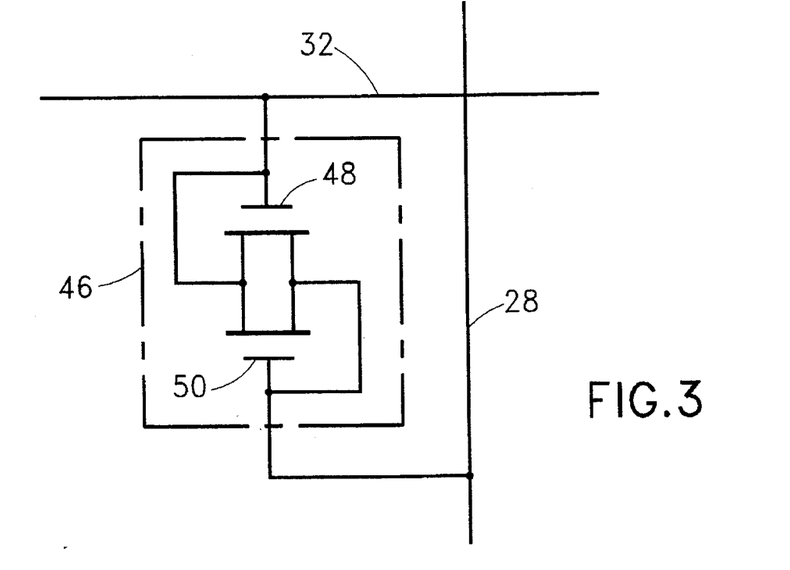
FIG. 3 is a circuit diagram showing the construction of the switching circuit.

The short circuit wire 36 is connected to respective data lines 28a through 28m via a switching circuit 46 as a switching means of the present invention. As shown in FIG. 3, the switching circuit 46 provides two TFTs 48 and 50. The gate and drain of TFT 48 are connected to the short circuit wire 36. The drain of TFT 48 is connected to the source of TFT 50 whereas the source of TFT 48 is connected to the drain of TFT 50. The gate and drain of TFT 50 are connected to data line 28. Incidentally, the present invention uses as TFT 48 and 50 a thin film transistor that turns on when voltage of 2 V or more is applied to the gate. Incidentally, the short circuit 38 is connected to respective gate lines 32a through 32n via a switching circuit 52 having the same construction as the above switching circuit 46.

Figure 4:
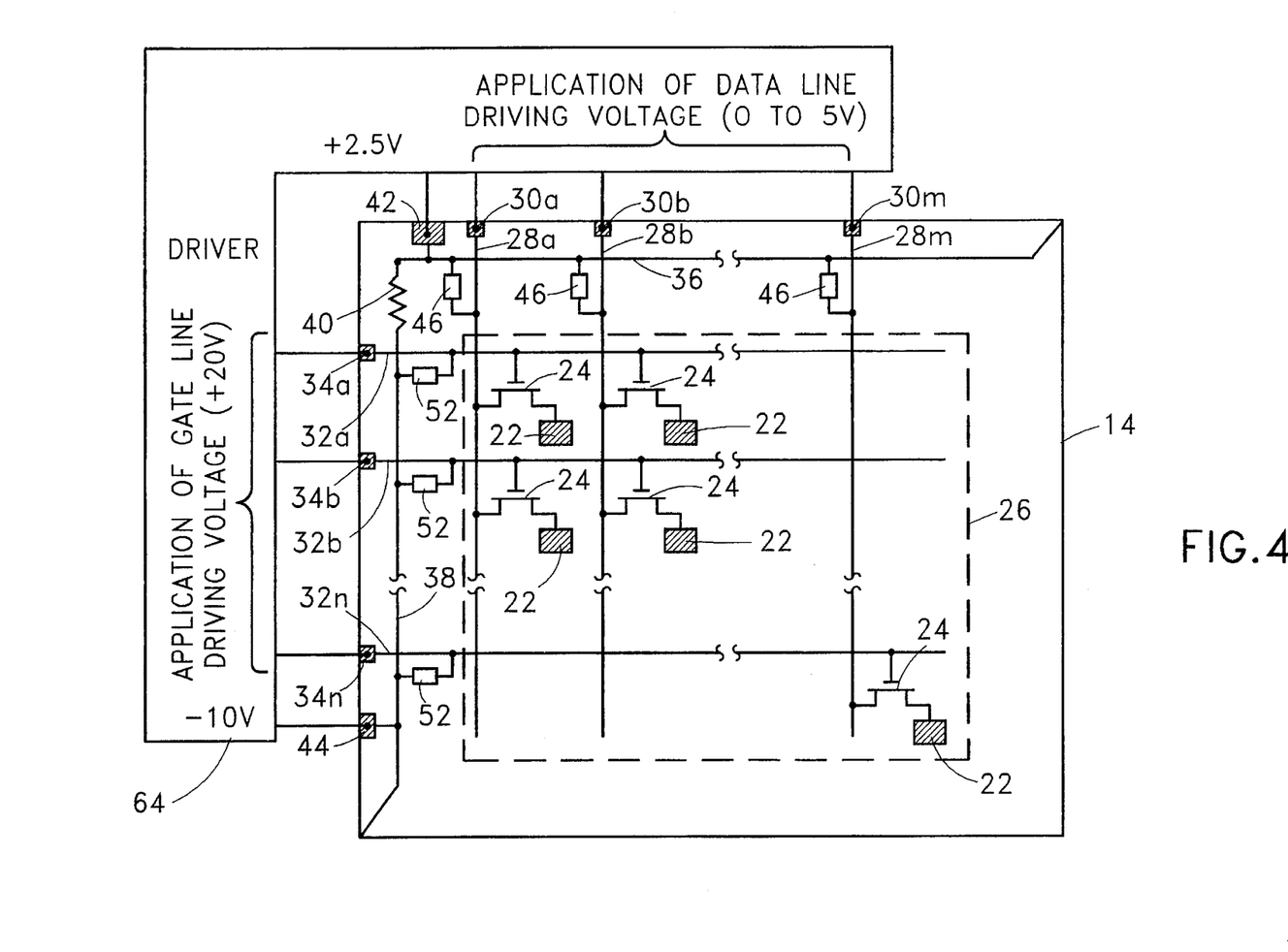
FIG. 4 is a schematic view showing a state in which a driver for driving a liquid crystal display including a transparent substrate is connected to the transparent substrate from which a portion on which an external short circuit wire is formed is cut off from FIG. 2.

Furthermore, at the last step of manufacturing a liquid crystal display 10, a region of the transparent substrate 14 is removed which is located in the external periphery of a region segmented by a cutting line L designated by an imaginary line in FIG. 2 (see FIG. 4). In a region which is removed at the last step, an external short circuit wire (external short ring) 54 and four electrodes 56A through 56D are provided so as to surround the internal periphery segmented with a cutting line L. The electrodes 56A through 56D are each connected to the external short circuit wire 54. Incidentally, the ends of the short circuit wires 36 and 38 are connected to the external short circuit wire 54 via each of the resistances 58, 60 and 62.

As the first operation of Embodiment 1 of the present invention, the manufacturing of the liquid crystal display will be explained. The pattern (circuit) shown in FIG. 2 is formed on the transparent substrate 14 and an electrode 20 is formed on the transparent substrate 16. In accordance with the predetermined orientation direction of the liquid crystal molecules, the surfaces of the transparent substrates 14 and 16 are treated followed by assembling cells so that the transparent substrates 14 and 16 are disposed with a spacer 12 therebetween to space them by a predetermined distance, followed by sealing the cell periphery with a bonding agent. Then a liquid crystal 18 is injected to the inside of the cell before sealing the injection hole. Thereafter, accessories such as a polarizer, a reflection plate, and a film and a liquid crystal display 10 are completed through an inspection process.

In the process of manufacturing the liquid crystal display 10 mentioned above, static electricity can become charged in the transparent electrode 14 or the like so that the potential of specific data line 28, gate line 32 in the transparent substrate rises. For example, when the potential of the specific data line 28 rises, a difference between the gate potential (same as data line 28) of TFT 50 in a switching circuit 46 and the source potential (same as the short circuit wire 36) assumes at least a predetermined value (2 V) to turn on the TFT 50. This allows current to pass through the drain of TFT 50 and the source of TFT 50 from the data line 28 to the short circuit wire 36, thus lowering the potential of the data line 28 and thereby preventing the potential of the specific data line 28 from exceeding the predetermined value.

Incidentally, if the potential of the short circuit wire 36 exceeds the potential of the data line 28, the difference between the gate potential (same as the short circuit wire 36) of TFT 48 in the switching circuit 46 and the source potential (same as the data line 28) exceeds a predetermined value, turning on TFT 48. This allows current to pass through the drain of TFT 48 and the source of TFT 48 from the short circuit wire 36 to the data line 28, thus lowering the potential in the short circuit wire 36. In this way, the switching circuit 46 maintains the potential of data lines 28a through 28m and the potential of the short circuit wire 36 on approximately the same level. The potential of gate lines 32a through 32n and the potential of the short circuit wire 38 are kept on approximately the same level with the operation of the switching circuit 52 in a way that is similar to the above operation.

In addition, the short circuit wire 36 and the short circuit wire 38 are connected via a resistance 40. The short circuit wires 36 and 38 are further connected to the external short circuit wire 54 via resistances 58, 60 and 62. When there is a potential difference between two short circuit wires, current flows through resistances so that the potential of the circuits formed on the transparent substrate 14 is kept on approximately the same level. Consequently, a large voltage is applied to TFT 24 with higher potential at a specific portion in the circuit thus preventing deterioration and damage to TFT 24.

Many other steps in the manufacture of the liquid crystal display 10 are performed automatically. At each step, a conducting member (for example, a robot hand) is connected to electrodes 56A through 56D of the transparent electrode 14. Consequently, even when the transparent substrate 14 is entirely electrified, the electricity is discharged through the external short circuit wire 54 and electrodes 56A through 56D. Thus electric load gradually accumulates in the transparent substrate 14, preventing the potential in the transparent substrate 14 from becoming too high. Furthermore, the volume of the discharge current discharged via the external short circuit 54 and electrodes 56A through 56D is kept below a predetermined value by resistances 58, 60 and 62 so that excess current flows away at the time of discharge thus preventing the deterioration or breakage of TFT 24.

At the last step of the manufacturing process of the liquid crystal display 10, the transparent substrate 14 is cut along a cutting line L and the portion where the external short circuit wire 54 and resistances 58, 60 and 62 are formed is removed (see FIG. 4). This allows electrodes 30a through 30m, electrodes 34a through 34n, and electrodes 42 and 44 to be located on the end portion of the transparent substrate 14. When the potential difference between the short circuit wire 36 and the specific data line 28 exceed a predetermined value even in the above state, the switching circuit 46 operates. When the potential difference between the short circuit wire 38 and the specific gate line 32 exceeds the predetermined value, the TFT of the switching circuit 52 is turned on, thereby maintaining the potential of the transparent substrate 14 on approximately the same level.

A liquid crystal display 10 in which the transparent substrate 14 is cut along the cutting line L is provided on a portable computer or the like. Electrodes 30a through 30m of data lines 28a through 28m located at the end portion of the transparent substrate 14, electrodes 34a through 34n of gate lines 32a through 32n, the electrode 42 of the short circuit wire 36 and the electrode 44 of the short circuit wire 38 are each connected to the driver 64. When images are displayed on the liquid crystal display 10, the driver 64 applies +30 V to either of gate lines 32a through 32n and 0 V to the remaining gate lines while shifting the gate line to which +30 V is applied. This allows TFT 24 to be turned on one after another for each of m TFTs 24 connected to the same gate line 32.

In addition, to the driver 64, image data is entered from the main body of the display. The driver 64 applies to each of data lines 28a through 28m voltage in the range of 5 to 15 V depending on the image data of m pixels corresponding to m TFT 24 that are turned on simultaneously, synchronously with the switching of gate lines to which a voltage of +30 V is applied. This applies voltage depending on the image data to m image electrodes 22 connected to m TFT 24. With the application of this voltage to the liquid crystal 18, one pixel sequence is displayed in one image. Images are displayed on the liquid crystal display 10 with the repetition of the above operation.

While the driver 64 displays images on the liquid crystal display 10 as described above, a voltage of +10 V is applied to the short circuit wire 36 which corresponds to the average value of voltage applied to data lines 28a through 28m via the electrode 42. The voltage applied to data lines 28a through 28m ranges from 5 to 15 V. As a result, each of TFTs 48 and 50 in the switching circuit 46 connected between the short circuit wire 36 and data lines 28a through 28m is maintained in the OFF state. This keeps each of data lines 28a through 28m and the short circuit wire 36 insulated with resistance of $10^{10} \Omega$ thereby preventing current from flowing from the data line 28 to the short circuit wire 36.

In addition, the driver 64 applies voltage 0 V, which is approximately the average value of voltage applied to the gate lines 32a through 32n, to the short circuit wire 38 via the electrode 44. Since 0 V is applied to the gate lines 32a through 32n except for one gate line, each TFT of the switching circuit 52 connected to the gate line to which 0 V is applied is kept in the OFF state. This keeps a portion between each of gate lines 32a through 32n and the short circuit wire 38 with resistance of $10^{10} \Omega$ thereby preventing current from flowing from gate line 32 to the short circuit wire 38.

In the above construction, the power consumed in turning off each TFT of the switching circuits 46 and 52 is negligible. To the short circuit 36a voltage of +10 V is applied and to the short circuit 38 a voltage of 0 V is applied with the result that 10 V is applied across the resistance. Thus a certain quantity of electricity is consumed at resistance 40. However, power consumed at resistance 40 is sufficiently small compared with the power consumption of the main body of the liquid crystal 10. As one example, when the resistance 40 assumes 100 k$\Omega$, the power consumption P of the resistance 40 is:

$$\text{power of consumption } P = V^2 \div R = (10 \ V)^2 \div 100 \ k\Omega = 0.001 W$$

Incidentally, to one of the gate lines 32a through 32n, +30 V is applied with the result that the switching circuit 52 connected to the gate line is turned on. The power consumption is a very small value which does not affect the above power consumption P.

The power consumption of the entire liquid crystal 10 including the driver 64 is only 1 to 2 W so that the value of the above power consumption P does not affect the power consumption of the liquid crystal display 10. The power consumption P is sufficiently small for use in machines such as portable computers. Thus damage by static electricity can be prevented and power consumption can be reduced compared with the conventional type.

Embodiment 2:

Embodiment 2 of the present invention is explained next. Corresponding parts are designated with the same numerals as those used in Embodiment 1 and the explanation is omitted.

Figure 5:
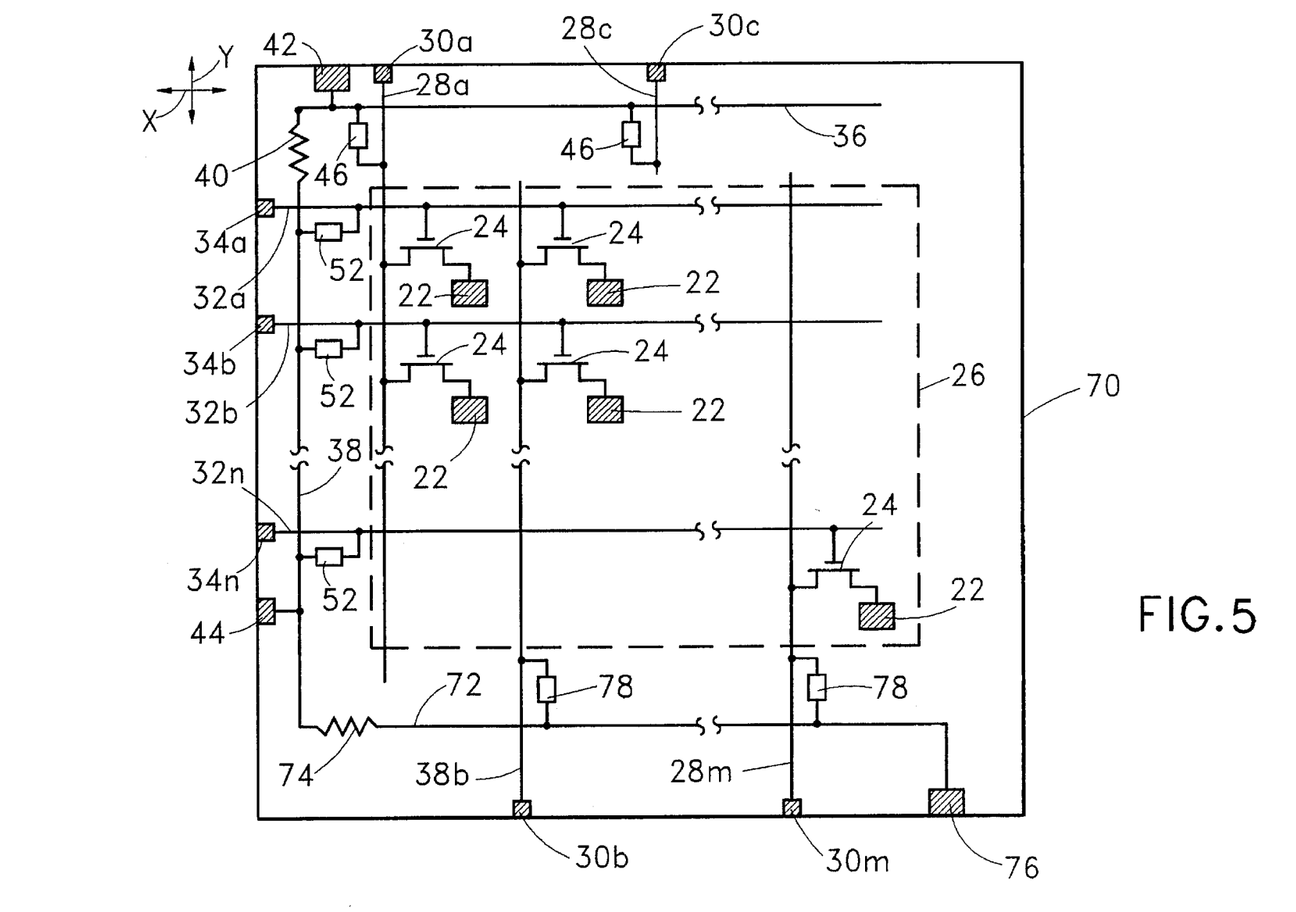
FIG. 5 is a schematic view showing the circuit formed on the transparent substrate according to Embodiment 2.

FIG. 5 shows a transparent substrate 70 from which a portion where the external short circuit wire 54 and electrodes 56A through 56D are formed is cut off. On the transparent substrate 70 electrodes 30a, 30c, etc. are formed for data lines on the upper end of FIG. 5 and electrodes 30b, etc. are formed for data lines on the lower end of FIG. 5. For data lines 28a through 28m, data line 28 connected to the electrode 30 on the upper end and data line 28 connected to the electrode 30 on the lower and are alternately arranged in direction X of FIG. 5.

Between the lower end of the display region 26 and the sequence of electrodes 30b, etc. of data line 28, the short circuit wire 72 is formed in direction X of FIG. 5. The short circuit wire 72 is connected to the short circuit wire 38 via resistance 74, and the circuit wire 72 is further connected to the electrode 76 arranged in alignment with a sequence of electrodes 30b, etc. In addition, data line 28 connected to electrode 30b, etc. is connected to the short circuit wire 72 via a switching circuit 78 having the same construction as Embodiment 1 of switching circuits 46 and 52.

When images are displayed on a liquid crystal display 10 constituted by including the transparent substrate 70 shown in FIG. 5, a voltage of +2.5 V is supplied from the driver 64 to the short circuit wire 72 like the short circuit wire 36 via the electrode 76 to turn off each TFT of a switching circuit 78 similarly to the switching circuit 46 of Embodiment 1. This keeps the portion between data line 28 and short circuit wire 72 almost completely insulated in the same manner as Embodiment 1. In the circuit shown in FIG. 5, electric power is consumed at the resistance 40 and the resistance 74 but the power consumption is sufficiently small compared with the main body of the liquid crystal display 10.

Embodiment 3:

Embodiment 3 of the present invention is explained next. Corresponding parts are designated with the same numerals as Embodiment 2, and the explanation thereof is omitted.

Figure 6:
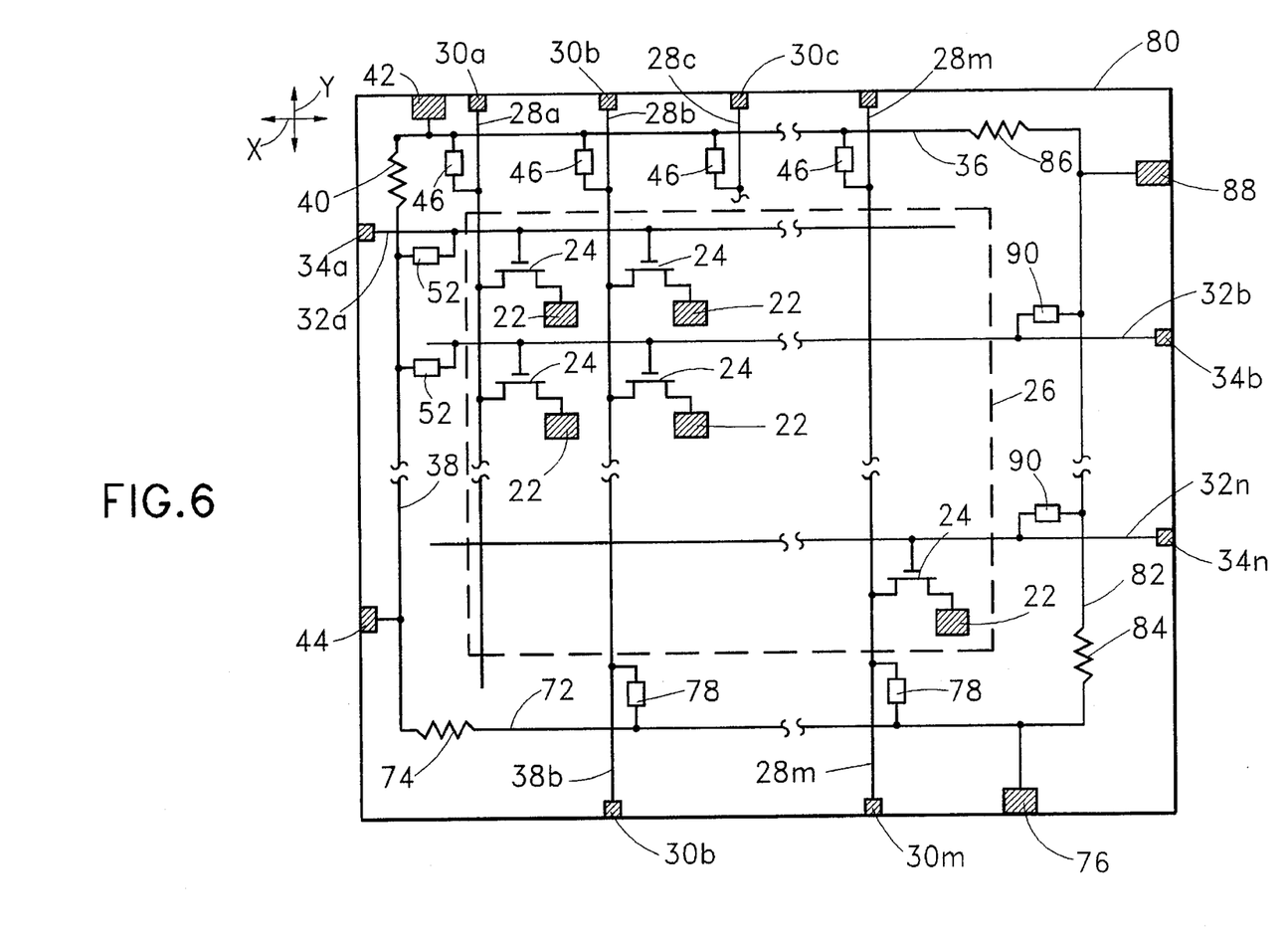
FIG. 6 is a schematic view showing a circuit formed on the transparent substrate in Embodiment 3.

In Embodiment 3 of transparent substrate 80 shown in FIG. 6, electrodes 34a, etc. for gate lines are provided on the left end of FIG. 6, and electrodes 34b, etc. for gate lines are provided on the right end thereof. For gate lines 32a through 32n, gate line 32 connected to electrodes 34a, etc. on the left end and gate line 32 connected to electrodes 34b, etc. on the right end are alternately arranged in direction Y of FIG. 6.

Between the right end of the display region 26 and electrodes 34b of the gate line 32 (in FIG. 6) the short circuit line 82 is formed in direction Y of FIG. 6. One end of the short circuit 82 is connected to the short circuit 72 via a resistance 84, whereas the other end thereof is connected to the short circuit wire 36 via a resistance 86, and the other end is further connected to the electrode 88 arranged in alignment with the sequence of electrode 34b, etc. The gate line 32 connected to electrodes 34b, etc. is connected to the short circuit wire 82 via a switching circuit 90 having the same construction as each of switching circuits 46, 52 and 78.

When images are displayed on a liquid crystal display 10 including a transparent substrate 80 shown in FIG. 6, 0 V is supplied from the driver 64 to the short circuit wire 82 via electrode 88 in the same manner as the short circuit wire 38. In the same manner as a switching circuit 52 in Embodiment 1, each TFT in each switching circuit 90 is turned off. This keeps a portion between the gate line 32 and the short circuit wire 82 in a practically insulated state, in the same manner as Embodiment 1. In a circuit shown in FIG. 6, electric power is consumed at resistances 40, 74, 84 and 86. The power consumption is sufficiently small compared with the power consumption in the main body of the liquid crystal display 10.

Incidentally, in the above construction, a definite voltage is applied to a plurality of portions divided by an impedance element, and each of the short circuit wires 36, 38, 72 and 82, but the present invention is not limited thereto. When the application voltage varies to the data lines and the gate lines changes, voltage applied to said plurality of portions may be varied so that each of the switching circuits 46, 52, 78 and 90 are kept in the off state.

In addition, an active matrix driving liquid crystal display has been described which uses TFT, but the present invention is not limited thereto. As switching elements, MOS transistors, barristers and MIMs, diodes or the like can be applied. The present invention is not limited to an active matrix drive. Furthermore, the display device of the present invention is not limited to a liquid crystal display. It is possible to apply each kind of display device providing a plurality of wiring structures for driving to the present invention.

ADVANTAGES OF THE INVENTION

As described above, the invention comprises a short circuit wire divided into a plurality of portions by impedance elements; switching means connected between said plurality of wiring structures for driving and said divided portions of said short circuit wire, and turning on and off in accordance with an electric potential difference between said wiring structures for driving and said divided portions of said short circuit wire; and voltage applying means for applying voltage for turning off said switching means to each of said plurality of divided portions of said short circuit wire, thereby preventing damage caused by static electricity and enabling the power consumption to be reduced. In addition, the display device according to the invention can be manufactured by the manufacturing method similar to the conventional one without increasing the number of processes.

The invention also comprises a method for driving a display device providing a plurality of wiring structures for driving, a short circuit wire divided into a plurality of portions with an impedance element, a switching means connected between each of the plurality of wiring structures for driving and turning on and off depending on the potential difference between divided portions, said method comprising:

applying voltage that turns off said switching means to each of said divided portions of said short circuit wire; and applying voltage to each of said plurality of wiring structures for driving to display an image. Thus the present invention has the excellent effect of driving the display device with low electric power consumption.

We claim:

1. A display device equipped with a plurality of gate lines and data lines for driving said display device, said display device having protection against static discharges comprising:

first and second short circuit wires;

a first impedance element connecting said first short circuit wire to said second short circuit wire through said first impedance;

first switching elements, each connected between a data line and said first short circuit wire, said first switching elements each turning on and off in accordance with an electric potential difference between said data line connected thereto and said first short circuit wire;

second switching elements, each connected between a gate line and said second short circuit wire, said second switching elements each turning on and off in accordance with an electric potential difference between said gate line connected thereto and said second short circuit wire; and voltage applying means for applying voltage to said first and second short circuit wires for turning said first and second switching elements off.

2. A display device as defined in claim 1 wherein said voltage applying means applies a different voltage to said first short circuit wire than to said second short circuit wire.

3. A display device as defined in claim 1 wherein said voltage applying means applies to said first short circuit wire a voltage approximately equal to the average voltage applied to said data lines connected to said first switching elements during operation of said display device and applies to said second short circuit wire a voltage approximately equal to the average voltage applied to said gate lines connected to said second switching elements during operation of said display device.

4. A display device as defined in claim 1 wherein said voltage applying means applies to said first short circuit wire a voltage approximately midway between a highest and a lowest voltage applied to said data lines connected to said first switching elements during operation of said display device.

5. A display device as defined in claim 4 wherein said voltage applying means applies to said second short circuit wire a voltage approximately equal to one of either a highest or a lowest voltage applied to said gate lines connected to said second switching elements during operation of said display device.

6. A display device as defined in claim 1 and further comprising:

a third short circuit wire;

a second impedance element connecting said third short circuit wire to said second short circuit wire through said second impedance; and third switching elements, each connected between a data line not connected to one of said first switching elements and said third short circuit wire, said third switching elements each turning on and off in accordance with an electric potential difference between said data line connected thereto and said third short circuit wire, said voltage applying means applying voltage to said third short circuit wire for turning said third switching elements off.

7. A display device as defined in claim 6 and further comprising:

a fourth short circuit wire;

a third impedance element connecting said fourth short circuit wire to said first short circuit wire through said third impedance; and fourth switching elements, each connected between a gate line not connected to one of said second switching elements and said fourth short circuit wire, said fourth switching elements each turning on and off in accordance with an electric potential difference between said gate line connected thereto and said fourth short circuit wire, said voltage applying means applying voltage to said fourth short circuit wire for turning said fourth switching elements off.

8. A display device as defined in claim 1 and further comprising:

a third short circuit wire;

a second impedance element connecting said third short circuit wire to said second short circuit wire through said second impedance; and third switching elements, each connected between a gate line not connected to one of said second switching elements and said third short circuit wire, said third switching elements each turning on and off in accordance with an electric potential difference between said gate line connected thereto and said third short circuit wire, said voltage applying means applying voltage to said third short circuit wire for turning said third switching elements off.

9. A display device as defined in claim 8 and further comprising:

a fourth short circuit wire;

a third impedance element connecting said fourth short circuit wire to said first short circuit wire through said third impedance; and fourth switching elements, each connected between a data line not connected to one of said first switching elements and said fourth short circuit wire, said fourth switching elements each turning on and off in accordance with an electric potential difference between said data line connected thereto and said fourth short circuit wire, said voltage applying means applying voltage to said fourth short circuit wire for turning said fourth switching elements off.

* * * * *